(12) United States Patent
Lesieur et al.

(10) Patent No.: US 6,203,587 B1
(45) Date of Patent: *Mar. 20, 2001

(54) COMPACT FUEL GAS REFORMER ASSEMBLAGE

(75) Inventors: Roger R. Lesieur, Enfield; Thomas J. Corrigan, Vernon, both of CT (US)

(73) Assignee: International Fuel Cells LLC, So. Windsor, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/233,223

(22) Filed: Jan. 19, 1999

(51) Int. Cl.$^7$ .................... B01J 7/00; C01J 1/00
(52) U.S. Cl. .................. 48/61; 48/94; 48/127.7; 48/198.8; 422/191; 422/203
(58) Field of Search ............... 48/61, 94, 127.9, 48/198.8, 127.7, 199 FM; 422/191, 203, 188, 189, 190; 423/650, 651, 652

(56) References Cited

U.S. PATENT DOCUMENTS

| | | |
|---|---|---|
| 4,308,233 | 12/1981 | Narumiya et al. ............. 422/169 |
| 4,810,685 * | 3/1989 | Twigg et al. ................. 502/60 |
| 5,733,347 * | 3/1998 | Lesieur ....................... 48/61 |
| 5,858,314 * | 1/1999 | Hsu et al. ................... 422/211 |
| 5,976,454 * | 11/1999 | Sterzel et al. ............... 419/2 |

FOREIGN PATENT DOCUMENTS 913 357 A2 * 5/1999 (EP) .
0 913 357 A1 5/1999 (EP) ............... C01B/3/38

* cited by examiner

*Primary Examiner*—Shrive Beck
*Assistant Examiner*—Frederick Varcoe
(74) *Attorney, Agent, or Firm*—William W. Jones

(57) ABSTRACT

A fuel gas reformer assemblage for use in a fuel cell power plant is formed from a composite plate assembly which includes spaced-apart divider plates with interposed monolithic open cell sponge-like members which form gas passages. The monolithic members have a lattice of internal open cells which are both laterally and longitudinally interconnected so as to provide for a diffuse gas flow. The entire surface area of the monolithic components is wash coated with a porous alumina layer, and selected areas of the wash coat are also catalyzed. The reformer assemblage is constructed from a series of repeating sub-assemblies, each of which includes a core of separate regenerator/heat exchanger gas passages. The core in each sub-assembly is sandwiched between a pair of reformer gas passage skins, which complete the subassembly. Adjacent reformer gas/regenerator/reformer gas passage sub-assemblies in the composite plate assembly are separated from each other by burner gas passages. The regenerator/heat exchanger gas passages and the reformer gas passages in each sub-assembly are connected by gas flow return manifolds which form a part of each sub-assembly. The fuel gases flow in one end of the assemblage, through the reformer gas passages, and then reverse their direction of flow in the return manifolds so as to exit the reformer assemblage through the regenerator gas flow passages. The burner gases flow in one end of the reformer assemblage and out the other end.

6 Claims, 3 Drawing Sheets

COMPACT FUEL GAS REFORMER ASSEMBLAGE

DESCRIPTION

1. Technical Field

This invention relates to a fuel gas steam reformer assemblage which is formed from a plurality of repeating subassemblies. More particularly, this invention relates to a fuel gas steam reformer assemblage which is compact and lighter in weight than conventional steam reformer assemblages used in fuel cell power plants.

2. Background Art

Fuel cell power plants include fuel gas steam reformers which are operable to catalytically convert a fuel gas, such as natural gas, into hydrogen and carbon dioxide. The conversion involves passing a mixture of the fuel gas and steam through a catalytic bed which is heated to a reforming temperature of about 1,250° F. to about 1,600° F. Catalysts typically used are nickel catalysts which are deposited on alumina pellets. A typical reformer will consist of a plurality of reaction tubes which are contained in a housing that is insulated for heat retention. The reaction tubes are heated by burning excess fuel gas in the housing and passing the burner gasses over the reaction tubes. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas stream mixture flows through the catalyst beds. The resultant heated hydrogen and carbon dioxide gas mixture then flows through the central exhaust passages in each tube so as to assist in heating the inner portions of each of the annular catalyst beds; and thence from the reformer for further processing and utilization.

Steam reformers require a large amount of surface area in the catalyst bed in order to provide a high degree of catalyst-fuel mixture interaction and a large heat transfer surface area to produce the amount of hydrogen required to operate the fuel cells at peak efficiency. This need for large catalyst bed and heat transfer surface area, when met by using catalyst-coated (hereinafter "catalyzed") pellets in tubular reformers, results in undesirably large and heavy reformer assemblies. For example, a commercially available 200 KW acid fuel cell power plant includes a steam reformer component which has a volume of about 150 to 175 cubic feet; and weighs about 3,500 lbs.

U.S. Pat. No. 5,733,347, granted Mar. 31, 1998 discloses a steam reformer assembly which does not utilize catalyzed pellets, but rather uses a corrugated reformer core which has catalyzed walls. The corrugated reformer core forms parallel passages for the fuel being reformed, and also forms adjacent parallel burner gas passages which are disposed in direct heat exchange relationship with the reformer passages. Likewise, the reformer passages are in direct heat exchange relationship with the regenerator passages. This assembly is lighter in weight and more compact than a steam reformer which uses catalyzed pellets and, because of the very high surface area of the corrugated core, provides very efficient heat transfer between the catalyzed reformer passages and the burner gas and regenerator passages. The assembly is formed from a sequence of essentially flat plates sandwiched around corrugated passages, and the assembly has a repeating pattern of burner passage, reformer passage, regenerator passage, reformer passage, burner passage, etc.. Gas flow reversal manifolds connect the reformer passages with the regenerator passages. While the aforesaid flat plate assembly accomplishes the desired reduction in weight and size, it does not diffuse the gas flow patterns of the gases passing through it because of the inclusion of the corrugated gas flow passages. Thus the corrugated design provides a more desirable size and weight reformer assembly, but the catalyzed pellet design provides a more desirable diffuse gas flow pattern. It would be highly desirable to provide a steam reformer which is suitable for use in a fuel cell power plant, which reformer supplies the diffuse gas flow pattern of the catalyzed pellets and is compact and light in weight like the catalyzed wall reformer described above.

DISCLOSURE OF THE INVENTION

This invention relates to a steam reformer structure which provides the necessary catalyzed and heat transfer surface area, is compact and light weight, and provides an internal diffuse gas flow pattern. The steam reformer structure of this invention is similar to the above-referenced patented reformer assembly in that it is formed from a series of essentially flat plate reformer components. Each of the reformer components includes outer reformer passages sandwiched around a plurality of central regenerator/heat exchanger passages. At a first end of the component, the reformer passages are connected to a fuel-steam manifold which feeds the fuel-steam mixture into the reformer passages. The opposite end of each component is provided with a flow reversal manifold that directs the fuel gas-steam mixture emanating from the outer reformer passages back into the central regenerator/heat exchanger passages. A reformer exit manifold is also disposed at the first end of each component to direct the reformed gas stream to the next fuel processing station in the power plant. Adjacent reformer components are separated from each other by burner gas passage plates through which the reformer burner gases flow. Thus, each of the reformer passage plate units is disposed directly adjacent to a burner passage plate unit, and the adjacent reformer and burner passages share a common wall.

The flat plate components of the steam reformer assembly may be formed from planar metal sheets which are separated from each other by monolithic gas flow passage components. The monolithic gas flow components are provided with a network of interconnected open cells, the surfaces of which are catalyzed with a nickel catalyst, or with noble metal catalysts such as platinum, palladium, rhodium, nobium, or the like. The open cell foam network also provides the high surface area needed to provide sufficient catalyst to properly reform the fuel gas. In fact, the catalyzed surface area of the open cell foam is up to twice that of the catalyzed surface area of the corrugated panels. The open cell foam network also provides a diffuse gas flow pattern for gases passing through the monolith, since the gases will flow both laterally and longitudinally through the monolith. The metal sheets which make up the flat plate reformer and burner components of the assemblage have both surfaces covered with a catalyzed alumina coating. The walls of the regenerator sections of the assemblage are not catalyzed.

The surfaces to be catalyzed will be primed by means of a conventional wash coating process such as that provided by W. R. Grace and Co. or Englehard Corp.. The wash coating process produces a porous alumina layer which forms the base for the catalyst coating. Such wash coatings are presently used to produce automobile catalytic converters, wood stove catalytic emission units, and the like. The metal plates used to form the flat plate components are steel alloy plates containing aluminum which can be brazed or spot welded together with the foam; surface treated; wash coated; and then selectively coated with the catalyst. By catalyzing the reformer and burner passage heat transfer walls in the assemblage, operating temperatures of the reformer assemblage can be kept at a minimum. The use of the flat plate and open cell monolith construction, with its maximized surface area, allows minimization of the reformer size and weight. The walls of the regenerator heat exchanger passages are not catalyzed, although they may be provided with the wash coat primer layer. The core of the open cell monolith may be formed from nickel, stainless steel, an aluminum-stainless steel alloy, or a ceramic material. It will be understood that the interstices as well as the outside surfaces of the open cell monolith is wash coated and, where desirable, is also catalyzed.

It is therefore an object of this invention to provide an improved steam reformer assembly which reformer assembly is compact and light weight.

It is a further object of this invention to provide a reformer assembly of the character described which operates at lower temperatures than presently available reformer assemblies due to enhanced heat transfer properties of the assembly.

It is another object of this invention to provide a reformer assembly of the character described which provides diffuse flow paths for burner and fuel gases flowing through the assembly.

It is yet another object of this invention to provide a reformer assembly of the character described which has high surface area catalytic surfaces that are exposed to the process fuel gases flowing through the assembly.

These and other objects and advantages of this invention will become readily apparent to one skilled in the art from the following detailed description of a preferred embodiment of the invention when taken in conjunction with the accompanying drawings in which:

SPECIFIC MODE FOR CARRYING OUT THIS INVENTION

Figure 1:
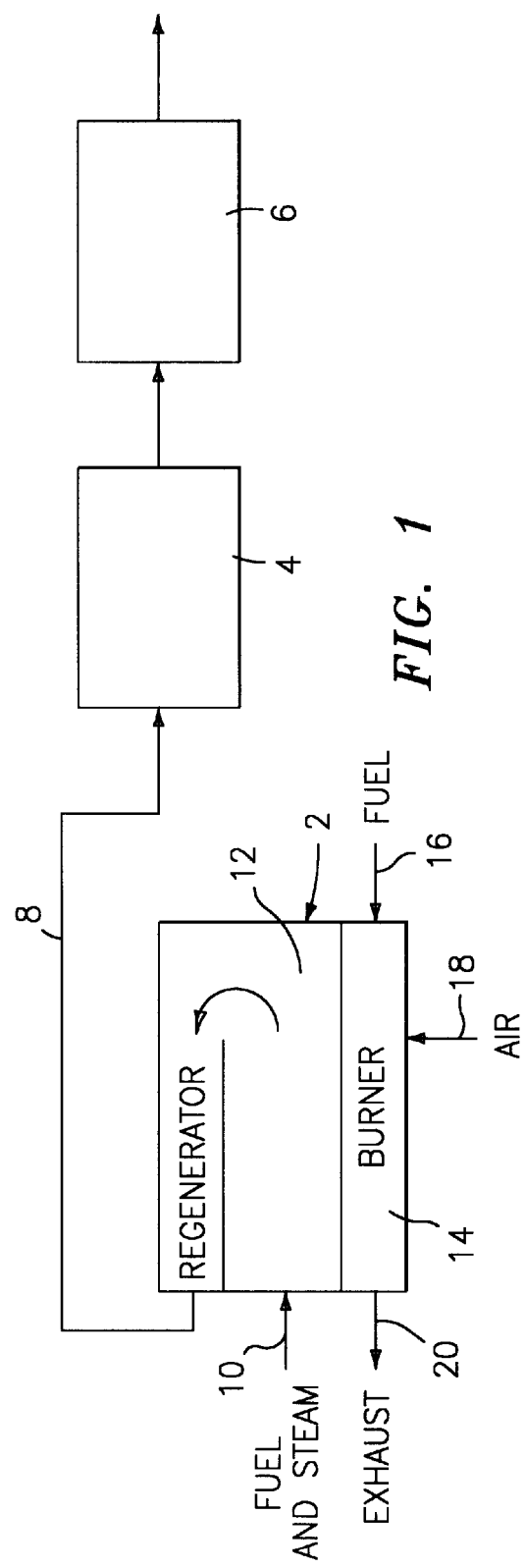
FIG. 1 is a schematic view of a fuel processor assembly which forms a portion of the fuel cell power plant.

Referring now to the drawings, there is shown in FIG. 1 a schematic view of a fuel processing assembly which forms a portion of a typical fuel cell power plant. The fuel processing assembly includes a fuel steam reformer regenerator station 2; a shift converter station 4; and a selective oxidizer station 6 which may be required for certain fuel cells that are intolerant to high levels of carbon monoxide. The reformer-regenerator 2 is connected to a shift converter 4 by means of a line 8. The reformer-regenerator station 2 includes a fuel and steam inlet line 10 which feeds the fuel and steam mixture into the catalyzed reformer zone 12. A mixture of partially spent fuel from the fuel cell stack and air is fed into a burner component 14 via lines 16 and 18. The aforesaid mixture is combusted therein to heat the fuel and steam mixture to reacting temperatures. The burner 14 is exhausted from the reformer-regenerator 2 via line 20.

Figure 2:
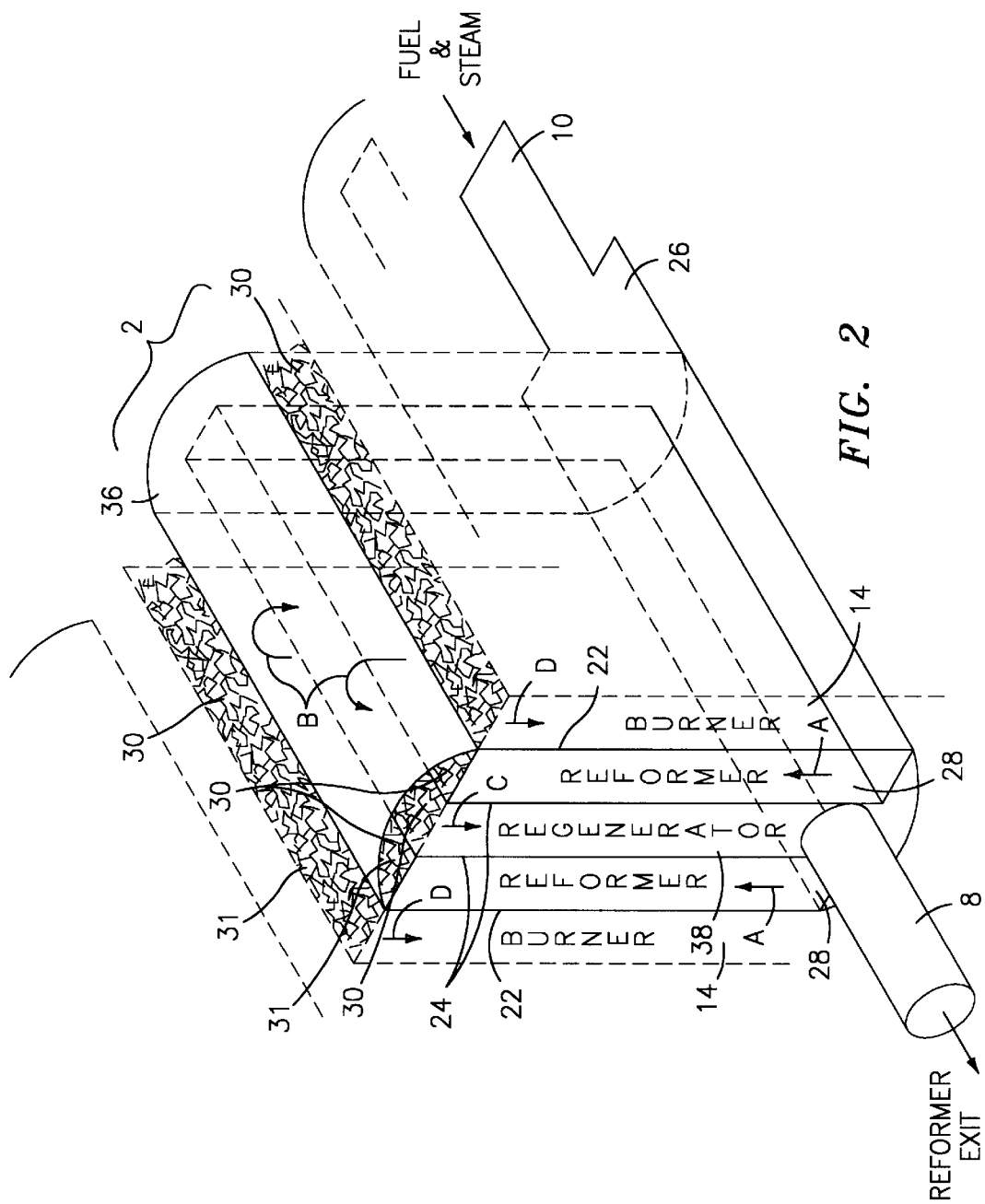
FIG. 2 is a schematic, fragmented perspective view of a single reformer unit component of a reformer assembly formed in accordance with this invention.

FIG. 2 is a schematic representation of an embodiment of a reformer-regenerator component 2 which is formed in accordance with this invention. The reformer-regenerator component 2 includes a pair of outer spaced-apart planar wall members 22, and a pair of inner spaced apart planar wall members 24. The reformer-regenerator component 2 also includes a fuel and steam mixture inlet line 10 which leads to a manifold 26 that opens into reformer sections 28 of the component 2. The reformer sections 28 are disposed between the planar wall members 22 and 24, and each of the reformer sections 28 includes a monolithic gas flow component 30 which is provided with a network of interconnected open cells 31. The monolithic open cell components 30 are also contained in the regenerator 38 and in the burner sections 14.

The fuel and steam mixture flows from the manifold 26 through the monolith 30 to a flow reversal manifold 36, as indicated by arrows A in FIG. 2. The mixture then reverses its direction of flow, as indicated by arrows B, and passes into the central regenerator-heat exchanger section 38 of the component 2. The regenerator-heat exchanger section 38 includes monoliths 30, as noted above. The gas stream flows through the regenerator-heat exchanger section 38 of the component 2, as indicated by arrow C, and into the reformer exit line 8. The component 2 is flanked by burner gas sections 14 which include monolith inserts 30. Hot burner gases flow through the burner passage monoliths 30 as indicated by arrows D.

The reformer assembly is composed of an appropriate number of the above-described components 22 positioned side-by-side, and separated from each other by burner gas sections 14. The outer walls 22 of the reformer sections 28 are heated by the burner gas sections 14, and the inner walls 24 of the reformer sections 28 are heated by the hot reformer effluent gas stream flowing through the regenerator-heat exchanger sections 38.

As previously noted, the metal components of the reformer, regenerator-heat exchanger and burner sections are preferably formed from a steel based alloy containing aluminum. The planar walls and the gas flow monoliths are assembled by brazing or welding the assembly. The assembly is then treated to allow the wash coat to adhere during thermal cycles, for example by heat treating to generate a surface coating of aluminum oxide on all of the exposed surfaces in the reformer, regenerator, and burner sections. A wash coating primer is then applied to at least the surfaces to be catalyzed. The wash coat can be applied to all of the exposed surfaces of the assemblage if so desired. The catalyzed coating is then applied to the wash coated surfaces of the burner and reformer passages.

Figure 3:
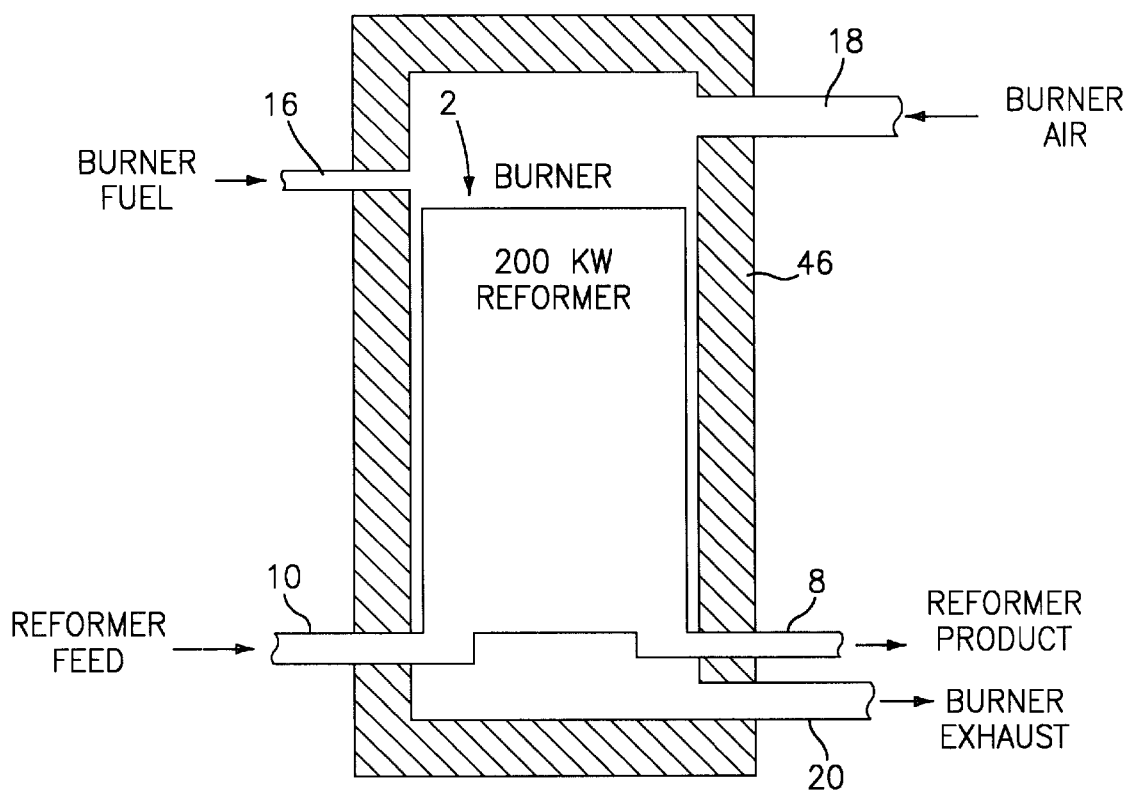
FIG. 3 is a schematic sectional view of a compact steam reformer formed in accordance with this invention.

Referring now to FIG. 3, there is shown schematically a steam reformer assembly for use in a 200 KW fuel cell power plant. The reformer assembly 2 is encased in an insulated housing 46. The burner fuel and burner air lines 16 and 18 enter the top of the housing 46, and burner exhaust gases are removed through an exhaust line 20 at the bottom of the housing 46. The reformer components 2 are disposed in the housing 46; the fuel-steam gas mixture is fed into the reformer components 2 via line 10 at the bottom of the housing 46; and the reformed gas is removed from the housing 46 via line 8.

The use of the plate construction with its planar parts, and the monolith gas flow passage components, results in a lightweight, sturdy steam reformer assembly which provides large surface area per unit volume of the reformer and very efficient heat transfer. The monolith gas flow components also result in a diffuse gas flow through the reformer assembly. The aforesaid plate construction can be used in steam reformers in a fuel cell power plant, or with stand alone steam reformers of the type shown in U.S. Pat. No. 4,098,587, granted Jul. 4, 1978 to O.L. Olesen et al, and others; or in steam reformers forming a part of a fuel cell assembly in a mobile vehicle. All surfaces of the reformer and burner sections of the reformer assembly can be catalyzed after wash coating the assembled reformer. Alternatively, the wash coating and catalyzing processes can be combined into a single step. The fact that the heated sections of the assembly share common walls with the reformer sections and that both sides of the walls are in intimate with an open cell monolith foam component allows the reformer walls to be operated at lower temperatures than the currently available catalyzed pellet type reformers. The weight and size savings achieved by using the construction described above is enhanced with larger higher power output fuel cell power plants, or stand-alone reformers. Stainless steel, aluminum-steel alloy, nickel and ceramic monolith cores of the type described above can be obtained from ERG Energy Research and Generation, Inc. of Oakland, Calif. which are sold under the registered trademark "DUOCEL".

Since many changes and variations of the disclosed embodiment of the invention may be made without departing from the inventive concept, it is not intended to limit the invention other than as required by the appended claims.

What is claimed is:

1. A hydrocarbon fuel gas steam reformer assembly comprising:
    (a) an inlet manifold for directing a mixture of the fuel gas and steam into the assembly;
    (b) a reformer section connected to said inlet manifold so as to receive a stream of the fuel gas and steam mixture, said reformer section being formed from first and second spaced-apart plates with a monolithic open cell foam member sandwiched between said first and second plates, said monolithic open cell member providing a diffuse gas flow path in said reformer section;
    (c) a regenerator-heat exchanger section adjacent to said reformer section, said regenerator-heat exchanger section being formed from said first plate and a third plate which is spaced-apart from said first plate on a side thereof opposite said second plate, said regenerator-heat exchanger section further including a monolithic open cell foam member which is sandwiched between said first and third plates, said monolithic open cell member providing a diffuse gas flow path in said regenerator-heat exchanger section, said first plate providing heat transfer from gas flowing through said regenerator-heat exchanger gas flow path to gas flowing through said reformer gas flow path;
    (d) a burner gas section adjacent to said reformer section on a side of said reformer section opposite to said regenerator-heat exchanger section, said burner gas section being formed from said second plate and a fourth plate, which fourth plate is spaced apart from said second plate, said burner gas section further including a monolithic open cell foam member which is sandwiched between said second and fourth plates, said monolithic open cell foam member providing a diffuse gas flow path in said burner gas section, said second plate providing heat transfer from burner gases flowing through said burner gas flow path to gases flowing through said reformer gas flow path;
    (e) a gas flow-reversing manifold connecting said reformer gas flow path with said regenerator-heat exchanger gas flow path, said gas flow-reversing manifold being operable to direct a gas stream exiting from said reformer section into said regenerator-heat exchanger section; and
    (f) an outlet manifold connected to said regenerator-heat exchanger section for removing reformed fuel gas from the assembly.

2. The fuel gas steam reformer assembly of claim 1, wherein said monolithic open cell foam members are made from a high temperature support material selected from the group consisting of stainless steel, an aluminum-stainless steel alloy, nickel, and ceramics, and/or mixtures thereof.

3. The fuel gas steam reformer assembly of claim 1, wherein interstices of said reformer section foam members are covered with a catalyzed alumina coating.

4. The fuel gas steam reformer assembly of claim 2, wherein interstices of said burner gas section foam members are covered with a catalyzed alumina coating.

5. A hydrocarbon fuel gas steam reformer assembly comprising: a regenerator-heat exchanger gas section; a reformer gas section; and a burner gas section; said regenerator-heat exchanger gas section and said burner gas section being sandwiched around said reformer gas section, said reformer gas section sharing a first common heat transfer wall with said regenerator-heat exchanger gas section and sharing a second common heat transfer wall with said burner gas section, each of said gas sections containing monolithic open cell foam members which provide diffuse gas flow paths between said heat transfer walls, interstices of said foam members in said burner and reformer gas sections being coated with a catalyzed alumina coating; an inlet manifold operably connected to said reformer gas section for introducing a fuel gas-steam mixture into reformer gas flow paths; a flow reversal manifold operably interconnecting said reformer gas section with said regenerator-heat exchanger gas section for transferring reformed gas from said reformer gas flow paths to regenerator-heat exchanger gas flow paths; and an outlet manifold operably connected to said regenerator-heat exchanger gas section for withdrawing reformed gas from said assembly.

6. A hydrocarbon fuel gas steam reformer assembly comprising: a central regenerator-heat exchanger gas section; a first reformer gas section disposed on one side of said regenerator-heat exchanger gas section, and second reformer gas section disposed on an opposite side of said regenerator-heat exchanger gas section; a first burner gas section disposed on an outer side of said first reformer gas section, and a second burner gas section disposed on an outer side of said s econd reformer gas section; said reformer gas sections sharing common heat transfer walls with said regenerator-heat exchanger gas section, and also sharing common heat transfer walls with said burner gas sections, each of said gas sections including respective diffuse gas flow paths which are formed by monolithic foam members that are secured to said heat transfer walls, the gas flow paths in said burner and reformer gas sections being coated with a catalyzed alumina coating; an inlet manifold operably connected to said reformer gas sections for introducing a fuel gas-steam mixture into said reformer gas flow paths; a flow reversal manifold operably interconnecting said reformer gas sections with said regenerator-heat exchanger gas section for transferring reformed gas from said reformer gas flow paths to said regenerator-heat exchanger gas flow paths; and an outlet manifold operably connected to said regenerator-heat exchanger gas section for withdrawing reformed gas from said assembly.

* * * * *